United States Patent [19]

Purdey

[11] 3,974,074

[45] Aug. 10, 1976

[54] SEPARATION OF LIQUIDS AND SOLIDS

[75] Inventor: John Anthony Purdey, Par, England

[73] Assignee: English Clays Lovering Pochin & Company Limited, Cornwall, England

[22] Filed: Apr. 3, 1975

[21] Appl. No.: 564,642

[30] Foreign Application Priority Data
Apr. 10, 1974 United Kingdom............... 16037/74

[52] U.S. Cl................................. 210/81; 210/350
[51] Int. Cl.² ............................................. B01D 23/24
[58] Field of Search ............... 210/81, 82, 391, 350, 210/351, 393; 423/155; 134/26, 29, 30, 34, 36

[56] References Cited
UNITED STATES PATENTS

| | | | |
|---|---|---|---|
| 3,679,052 | 7/1972 | Asper | 210/82 |
| 3,713,382 | 1/1973 | Gwilliam | 210/350 |
| 3,753,499 | 8/1973 | Gwilliam | 210/350 |

OTHER PUBLICATIONS

Smith, A.; "Introduction to Inorganic Chemistry," The Century Co., N.Y., 3rd Ed., (1921), pp. 765–767.

Primary Examiner—Charles N. Hart
Assistant Examiner—Benoit Castel
Attorney, Agent, or Firm—Larson, Taylor and Hinds

[57] ABSTRACT

A method of removing solid particles, especially magnesium compounds, from the pores of the filter element of a tube pressure filter, by (A) washing the filter element whilst supported in the tube pressure filter with an aqueous cleaning solution containing a compound which reacts with the solid particles in the pores of the filter element to form a material which is at least partially soluble in said aqueous cleaning solution, and thereafter (B) washing the filter element whilst supported in the tube pressure filter with water or an aqueous solution of a soap or a detergent.

4 Claims, 1 Drawing Figure

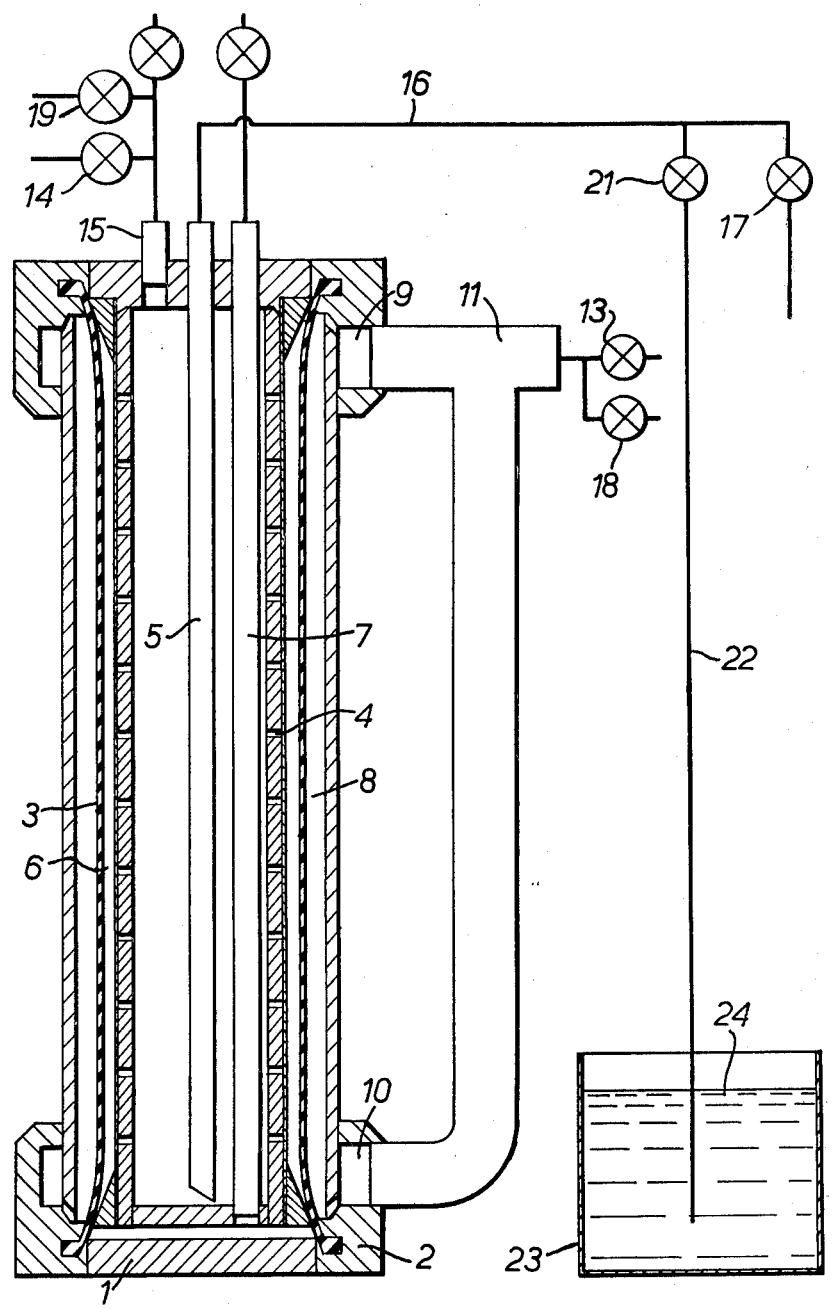

SEPARATION OF LIQUIDS AND SOLIDS

BACKGROUND OF THE INVENTION

This invention relates to the separation of liquids and solids and, more particularly, is concerned with a method of cleaning a filter element of a tube pressure filter which has become "blinded" by solid material, i.e. a large proportion of the pores of the filter element have become blocked by particles of solid material.

Tube pressure filters are a relatively recent addition to the wide range of filtration equipment which can be used for solid-liquid separation. By "tube pressure filter" there is meant herein apparatus which essentially comprises a pair of generally coaxial tubular bodies arranged one within the other and adapted to be supported in a generally upright position, an impermeable elastic sleeve disposed within and secured to the outer tubular body, a filter element disposed around and supported by the inner tubular body, outlet means for the discharge of filtrate which has passed through the filter element and through apertures in the inner tubular body from the interior of the inner tubular body, and means for displacing the tubular bodies axially relative to one another between first and second positions, the arrangement being such that in the first position of said tubular bodies they co-operate with each other to define a closed annular chamber which is divided into generally coaxial and non-intercommunicating inner and outer compartments by said impermeable elastic sleeve, the inner compartment having an inlet for a slurry of a particulate solid material and the outer compartment having an inlet for a hydraulic fluid under pressure, and in the second position of said tubular bodies said annular chamber is open to enable particulate solid material to be discharged from the inner compartment. Details of the construction and operation of tube pressure filters can be found, inter alia, in British Pat. Nos. 1,240,465; 1,240,466; 1,351,131; 1,351,142 and 1,351,943.

As solid particles become lodged in the pores of the filter element of a tube pressure filter during successive filtering cycles and a blinded filter element is formed the permeability of the filter element to filtrate, and thus the filtration rate, are progressively reduced. This has been found to be a major problem when the solid material is a magnesium compound such as magnesium oxide, magnesium hydroxide or magnesium carbonate. When the filtration rate has fallen below an acceptable level it becomes necessary to subject the blinded filter element to a cleaning process to remove at least the major part of the particles lodged in the pores.

An object of the invention is to provide a method of cleaning the filter element of a tube pressure filter which filter element has become blinded with solid material.

SUMMARY OF THE INVENTION

Accordingly, the invention provides a method of removing particles of solid material containing a magnesium compound from the pores of the filter element of a tube pressure filter, which method comprises (A) washing the filter element whilst supported on the inner tubular body of the tube pressure filter with an aqueous cleaning solution containing a compound which reacts with the particles of solid material in the pores of the filter element to form a substance which is at least partially soluble in said aqueous cleaning solution, preferably an ammonia compound and thereafter (B) washing the filter element whilst supported on the inner tubular body of the tube pressure filter with water or an aqueous solution of a soap or detergent.

The filter element may be washed with said aqueous cleaning solution either by immersing the inner tubular body, with the filter element supported thereon, in the aqueous cleaning solution and then vigorously agitating the aqueous cleaning solution and/or the filter element during the time the filter element is in the aqueous cleaning solution, or preferably by pumping the aqueous cleaning solution through the filter element, whilst the filter element and the inner tubular body are retained in the tube pressure filter with the inner and outer tubular bodies in their first position. In the former method of carrying out the invention it is advantageous for the filter element to be dried before being contacted with the aqueous cleaning solution. In the latter method of carrying out the present invention, the bottom of the inner tubular body is preferably closed, if it is not already closed, and then the following steps are carried out (a) the tube pressure filter is supported in an upright position with the tubular bodies in their first positon, (b) the interior of the inner tubular body is filled with an aqueous cleaning solution whilst there is introduced into the outer compartment of said tube pressure filter a hydraulic fluid, (c) the interior of said inner tubular body is connected to a source of the aqueous cleaning solution, (d) the hydraulic fluid is evacuated from the outer compartment of the tube pressure filter thereby drawing the cleaning solution through the filter element, (e) hydraulic fluid is reintroduced into the outer compartment of said tube pressure filter thereby forcing the cleaning solution back through the filter element into the interior of inner tubular body, (f) steps (d) and (e) are repeated until the filter element has been cleaned to a desired extent, and (g) steps (b) to (f) are repeated using water or an aqueous solution of a soap or detergent instead of said cleaning solution.

DESCRIPTION OF THE PREFERRED EMBODIMENTS

The compound which reacts with the particles of solid material to form a substance which is at least partially soluble in the aqueous cleaning solution is advantageously an ammonium compound, but an acid may also be used. Suitable ammonium compounds are ammonium chloride, ammonium sulphate, ammonium nitrate, ammonium hydroxide and ammonium acetate. Acids which can be used include hydrochloric acid, sulphuric acid, nitric acid and acetic acid. Phosphoric acid and ammonium phosphate are not suitable when the particles of solid material comprise a magnesium compound. In general, it is found that the concentration in the aqueous solution of the ammonium compound is advantageously in the range from about 5% to about 50% by weight, and the concentration in the aqueous cleaning solution of the acid is advantageously in the range from about 2% to about 10% by weight. If the concentrations are below the specified lower limits the process tends to be unacceptably slow, and if the concentrations are above the specified upper limits the risk of corrosion of metallic parts of the tube pressure filter becomes significantly greater, especially when acids are used.

The time for which the filter element will need to be washed with the aqueous cleaning solution has been found to vary from about 1 minute to about 5 hours according to the materials involved and the extent to which the filter element has become blinded.

When carrying out the washing step (B) it is advantageous if the water or aqueous solution of a soap or a detergent is vigorously agitated.

The present invention has been found to be particularly useful when the material of the solid particles which blind the filter element is a magnesium compound, such as magnesium hydroxide, magnesium oxide or magnesium carbonate. The aqueous cleaning solution preferably contains an ammonium compound which reacts with said solid particles of the magnesium compound to produce a substance which is at least partially soluble in the aqueous cleaning solution. Thus, in another aspect of the present invention there is provided, in a process for reducing the liquid content of a slurry of a particulate magnesium compound which process includes the steps of (i) supporting a tube pressure filter in an upright position with the tubular bodies of the tube pressure filter in their first position; (ii) introducing a quantity of the slurry of the magnesium compound under pressure into the inner compartment of the tube pressure filter whilst introducing into the outer compartment of said tube pressure filter a hydraulic fluid; (iii) raising the pressure of said hydraulic fluid to a high pressure and maintaining it at said high pressure for a time sufficient to effect a reduction in the liquid content of the slurry of the magnesium compound and form a cake of the magnesium compound on the filter element; (iv) withdrawing the hydraulic fluid from the outer compartment; (v) displacing the tubular bodies of the pressure filter axially relative to one another to their second position, (vi) discharging filter cake from the inner compartment, (vii) returning the tubular bodies of the tube pressure filter to their first position, and (viii) repeating steps (ii) to (vii) until the filter element of said tube pressure filter is blinded, the step of cleaning said blinded filter element by (A) washing the filter element, after discharge of filter cake from the inner compartment and whilst supported on the inner tubular body of the tube pressure filter, with an aqueous cleaning solution containing an ammonium compound, and thereafter (B) washing the filter element whilst supported on the inner tubular body of the tube pressure filter with water or with an aqueous solution of a soap or a detergent. In one embodiment of this process, the filter element is cleaned by removing the inner tubular body, with the filter element supported thereon, from the tube pressure filter; drying the filter element on the inner tubular body in a current of warm, dry air; immersing the inner tubular body and filter element in an aqueous cleaning solution containing an ammonium compound, usually for a period of time in the range from 1 minute to about 5 hours, the aqueous solution being vigorously agitated during this period; removing the inner tubular body and the filter element from the aqueous cleaning solution; washing the surface of the filter element with fine, high pressure jets of a solution of a detergent in water; rinsing the surface of the filter element with clean water to remove the detergent; and replacing the inner tubular body and filter element in the tube pressure filter. In another embodiment of the above process, the filter element is cleaned by ensuring that the tubular bodies of the pressure filter are in their first position; filling the interior of the inner tubular body of the pressure filter with an aqueous cleaning solution containing an ammonium compound (if necessary, after closing the bottom of the inner tubular body); causing the aqueous cleaning solution to flow through the filter element, first in one direction and then in the opposite direction, by repeatedly introducing hydraulic fluid into the outer compartment of the tube pressure and subsequently withdrawing it therefrom; removing the aqueous cleaning solution from the interior of the inner tubular body of the tube pressure filter and replacing it with an aqueous solution of a detergent; causing the aqueous solution of detergent to flow through the filter element, first in one direction and then in the opposite direction, by repeatedly introducing hydraulic fluid into the outer compartment of the tube pressure and subsequently withdrawing it therefrom; removing the aqueous solution of detergent from the interior of the inner tubular body of the tube pressure filter and replacing it with clean water; causing the clean water to flow through the filter element, first in one direction and then in the opposite direction, by repeatedly introducing hydraulic fluid into the outer compartment of the tube pressure and subsequently withdrawing it therefrom, so as to rinse the filter element; and removing the rinsing water from the tube pressure filter.

For a better understanding of the invention and to show more clearly how the same may be carried into effect, reference will now be made, by way of example, to the accompanying drawing which shows an apparatus suitable for carrying out the method of the invention. The drawing shows a tube pressure filter which comprises an inner tubular body 1 closed at its lower end and an outer tubular body 2 coaxial therewith, an impermeable elastic sleeve 3 which is disposed within and secured at its ends to the outer tubular body, a filter element 4 disposed around and supported by the inner tubular body, and outlet means 5 for the discharge of filtrate which has passed through the filter element and through apertures in the inner tubular body from the interior of the inner tubular body. The tube pressure filter also comprises means (not shown) for displacing the tubular bodies axially relative to one another between first and second positions.

In the first position of the tubular bodies (as shown in the drawing), the tubular bodies co-operate with each other to define a closed annular chamber which is divided into generally coaxial and non-intercommunicating inner and outer compartments, 6 and 8 respectively, by the impermeable elastic sleeve 3. The inner compartment 6 has inlet means 7 for a wet, particulate solid material and the outer compartment 8 has an upper inlet 9 and a lower inlet 10 for hydraulic fluid under pressure, the two inlets both being connected to a conduit 11 which communicates via a valve 13 with a source of hydraulic fluid under pressure.

In the second position of the tubular bodies (which is achieved by lowering the inner tubular body 1) the annular chamber is open to enable particulate solid material to be discharged from the inner compartment. Further details of the construction of the tube pressure filter are given inter alia in British Pat. Nos. 1,240,465, 1,351,142 and 1,351,943.

The operation of the tube pressure filter to dewater an aqueous slurry of magnesium hydroxide will now be described:

With the tubular bodies in their first position, a slurry of magnesium hydroxide is fed from a reservoir (not shown) through a valve 12 to inlet means 7 and thence to the inner compartment 6. At the same time a hydraulic fluid at low pressure is supplied through a valve 13 to the outer compartment 8 in order to urge the elastic sleeve 3 towards the inner tubular body so as to restrict the annular orifice through which the magnesium hydroxide slurry enters inner compartment 6, thus increasing its velocity and scouring the lower parts of the inner tubular body clean of any filter cake remaining from a previous cycle. When inner compartment 6 is full, valve 12 is closed and hydraulic fluid at high pressure is introduced through valve 13 and filtrate is forced through the filter element 4 into the interior of the inner tubular body. Air at low pressure (about 5 psig) is introduced into the interior of the inner tubular body through a valve 14 and a conduit 15 and filtrate is forced up outlet means 5 and through a conduit 16 and a valve 17 to a suitable storage vessel (not shown). When filtrate ceases to flow valves 13 and 14 are closed, and the outer compartment 8 is connected to a vacuum pump (not shown) by a valve 18. By means of the vacuum pump the elastic sleeve 3 is drawn back against the inner wall of the outer tubular body. The inner tubular body is then lowered so that the tubular bodies assume their second position, and filter cake is dislodged from the filter element by one or more discrete blasts of air at a pressure of about 10–50 psig which are delivered to the inside of the inner tubular body by opening and closing a valve 19. The tubular bodies are then moved back to their first position and the cycle is repeated until the filter element becomes blinded with magnesium hydroxide and the filtration rate becomes unacceptably low.

When the filter element has become blinded the tubular bodies are returned to their first position after the last batch of filter cake has been discharged and valves 12, 14, 17 and 19 are closed. The filter element is then cleaned as follows: (a) the tube pressure filter is maintained in an upright position with the tubular bodies in their first position; (b) hydraulic fluid at a low pressure (about 50 psig) is supplied through valve 13 to outer compartment 8 to urge the elastic sleeve against the filter element and an aqueous cleaning solution comprising 20% by weight of ammonium chloride in water is run into the interior of the inner tubular body from a reservoir (not shown) through a valve 20 and a conduit 15; (c) when the aqueous cleaning solution fills the inner tubular body, a valve 21 is opened to put outlet means 5 into communication, through conduit 16 and a conduit 22, with a tank 23 containing large volume of the same aqueous cleaning solution 24 and valve 20 is closed; (d) (i) valve 13 is then closed and (ii) valve 18 is opened to connect outer compartment 8 to the vacuum pump (at 22 in. Hg. vacuum) and the elastic sleeve 3 is drawn back thus drawing cleaning solution through the filter element into compartment 6; (e)(i) valve 18 is then closed and (ii) valve 13 is opened to connect outer compartment 8 to the source of hydraulic fluid at low pressure thus urging the elastic sleeve 3 against the filter element and forcing the cleaning solution back through the filter element; (f) steps (d) and (e) are then repeated for a sufficient number of cleaning cycles to remove the magnesium hydroxide from the pores of the filter element whereafter, with outer compartment 8 connected to the source of hydraulic fluid at low pressure, valve 14 is opened to admit air at a pressure of 5 psig into the interior of the inner tubular body and the cleaning solution is expelled through valve 21 into tank 23; and (g) steps (b) to (f) above are repeated using an aqueous solution of a detergent instead of the aqueous cleaning solution.

In the cleaning of the filter element of a typical tube pressure filter, the total volume of cleaning solution in the filter when the elastic sleeve was drawn back against the inner wall of the outer tubular body was 12.2 gallons and the volume of cleaning solution displaced when the elastic sleeve was urged by hydraulic fluid at low pressure against the filter element was 8.2 gallons.

The efficacy of the invention is illustrated by the following tests:

A nylon filter cloth, which weighed 7 oz. per square yard, was used as the filter element in a tube pressure filter of the type described in British Pat. No. 1,240,465 to dewater an aqueous slurry of magnesium hydroxide containing a little silica and traces of heavy metal oxides as impurities. The filter cloth was found to be blinded with solid material after about 4,000 pressing cycles, each of 3 minutes duration, i.e. after a total running time of about 200 hours. Samples of the blinded filter cloth were subjected to the following tests:

1. A sample was thoroughly dried, soaked for 5 minutes in an aqueous solution containing 5% by weight of sulphuric acid, and then washed in clean running water.
2. A sample was thoroughly dried, soaked for 1 hour in an aqueous solution containing 3% by weight of acetic acid and then washed in clean running water.
3. A sample was thoroughly dried, soaked for 2 hours in an aqueous solution containing 20% by weight of ammonium chloride and then washed in clean running water.
4. A sample was thoroughly dried, soaked for 10 minutes in an aqueous solution containing 6% by weight of ammonium hydroxide, and then washed in clean running water.
5. A sample was thoroughly dried, soaked for 5 minutes in an aqueous solution containing 5% by weight of sulphuric acid and then washed with soap and water with vigorous agitation.

Each sample was tested before and after treatment for permeability to air by drawing air under vacuum through a measured area of cloth at a rate of 4.0 liters per minute and measuring the pressure drop across the cloth in inches of mercury. Most of the samples were also tested for ash content by completely incinerating a weighed sample of cloth at 1000°C. and weighing the residue. A sample of unused 7 oz. nylon cloth was also subjected to the same tests. The results obtained are set forth in the Table below.

TABLE

| Sample | Air resistance (in. of mercury/ sq.in. of cloth) | Ash content (% by weight) |
|---|---|---|
| Unused nylon cloth | 0.6 | 0.0 |
| Blinded cloth before treatment | 5–7 | 4.95 |
| Blinded cloth after treatment No. 1 | 2–2.5 | 1.30 |
| 2 | 2–2.5 | — |
| 3 | 2–2.5 | 1.10 |
| 4 | 4 | — |
| 5 | 0.4 | 0.28 |

In order to determine whether the cleaning process had weakened the nylon filter cloth, samples of the blinded cloth before treatment and of the blinded cloth after treatment Nos. 1 and 3, were subjected to a tensile test in a Houndsfield Tensometer. Strips of cloth measuring 1 inch by 6 inches were cut from the filter element, the longer dimension being in the direction of the circumference of the cylindrical filter element, i.e. each strip was a part of a hoop 1 inch in width. The force in pounds required to break each strip is given below.

| Sample | | Breaking Force lbs/inch |
| --- | --- | --- |
| Blinded filter cloth before treatment | | 190 |
| Blinded filter cloth after treatment No. | 1 | 185 |
| | 3 | 182 |

These results show that the cleaning process does not significantly weaken the filter cloth.

I claim:

1. In a process for reducing the liquid content of a slurry of a particulate magnesium compound which process includes the steps of (i) supporting a tube pressure filter, comprising a pair of generally coaxial inner and outer tubular bodies arranged one within the other, in an upright position with the tubular bodies of the tube pressure filter in their first position; (ii) introducing a quantity of the slurry of the magnesium compound under pressure into an inner compartment of the tube pressure filter whilst introducing into an outer compartment of said tube pressure filter a hydraulic fluid; (iii) raising the pressure of said hydraulic fluid to a high pressure and maintaining it at said high pressure for a time sufficient to effect a reduction in the liquid content of the slurry of the magnesium compound and form a cake of the magnesium compound on a filter element disposed around and supported by the inner tubular body; (iv) withdrawing the hydraulic fluid from the outer compartment; (v) displacing the tubular bodies of the pressure filter axially relative to one another to their second position; (vi) discharging filter cake from the inner compartment; (vii) returning the tubular bodies of the tube pressure filter to their first position, and (viii) repeating steps (ii) to (vii) until the filter element of said tube pressure filter is blinded, the improvement which comprises cleaning said blinded filter element by a method which comprises closing the bottom of the inner tubular body of the tube pressure filter, if it is not already closed, and thereafter carrying out the following steps:

(a) supporting the tube pressure filter in an upright position with the tubular bodies in their first position, (b) filling the interior of the inner tubular body with an aqueous cleaning solution containing a sufficient amount of an ammonium compound which reacts with said solid particles of the magnesium compound to form a substance which is at least partially soluble in the aqueous cleaning solution whilst introducing into the outer compartment of said tube pressure filter a hydraulic fluid, (c) connecting the interior of said inner tubular body to a source of the aqueous cleaning solution, (d) evacuating the hydraulic fluid from the outer compartment of the tube pressure filter thereby drawing the cleaning solution through the filter element, (e) reintroducing hydraulic fluid into the outer compartment of said tube pressure filter thereby forcing the cleaning solution back through the filter element into the interior of inner tubular body, (f) repeating steps (d) and (e) until the filter element has been cleaned to a desired extent, and (g) repeating steps (b) to (f) using water or an aqueous solution of a soap or detergent instead of said aqueous cleaning solution.

2. A method according to claim 1 wherein said magnesium compound comprises magnesium oxide, magnesium hydroxide or magnesium carbonate.

3. A method according to claim 1, wherein said ammonium compound is ammonium chloride, ammonium sulphate, ammonium nitrate, ammonium hydroxide or ammonium acetate.

4. A method according to claim 1 wherein the cleaning solution contains from 5% to 50% by weight of the ammonium compound.

* * * * *